US012530890B2

(12) United States Patent
Hayman

(10) Patent No.: US 12,530,890 B2
(45) Date of Patent: Jan. 20, 2026

(54) DAMAGE DETECTION AND ANALYSIS USING THREE-DIMENSIONAL SURFACE SCANS

(71) Applicant: Allstate Insurance Company, Northbrook, IL (US)

(72) Inventor: George Hayman, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 1085 days.

(21) Appl. No.: 17/540,069

(22) Filed: Dec. 1, 2021

(65) Prior Publication Data

US 2022/0171068 A1   Jun. 2, 2022

Related U.S. Application Data

(60) Provisional application No. 63/229,409, filed on Aug. 4, 2021, provisional application No. 63/120,279, filed on Dec. 2, 2020.

(51) Int. Cl.
*G06V 20/40* (2022.01)
*G01S 7/51* (2006.01)
(Continued)

(52) U.S. Cl.
CPC .............. *G06V 20/44* (2022.01); *G01S 7/51* (2013.01); *G01S 17/894* (2020.01); *G01S 17/95* (2013.01);
(Continued)

(58) Field of Classification Search
CPC ...................................................... G01S 17/89
See application file for complete search history.

(56) References Cited

U.S. PATENT DOCUMENTS 10,134,092 B1 * 11/2018 Harvey ................ G06V 20/176
10,234,092 B2    3/2019 Huang
(Continued)

OTHER PUBLICATIONS

Stein, "Lidar is one of the iPhone and iPad's coolest tricks. Here's what else it can do," CNET, retrieved from https://www.cnet.com/tech/mobile/lidar-is-one-of-the-iphone-ipad-coolest-tricks-its-only-getting-better/, 8 pages (2020).

*Primary Examiner* — Akwasi M Sarpong
*Assistant Examiner* — Michael L Burleson
(74) *Attorney, Agent, or Firm* — Akerman LLP

(57) ABSTRACT

Disclosed herein are systems, methods, and computer-readable media for damage assessment using multi-dimensional surface scans. In an example embodiment, an electronic damage assessment request related to the property is received. The electronic damage assessment request comprises first location information. Based on second information provided by a mobile device comprising a LIDAR sensor associated with the computing platform, the mobile device is determined to be in a target spatial location corresponding to the first location information. Based on determining that the mobile device is in the target spatial location, a scan is initiated by the LIDAR sensor. Depth sensor data associated with a surveyed area of the property is received from the LIDAR sensor. Based on the depth sensor data, a three-dimensional surface scan of the surveyed area of the property is generated. Damage to the property is assessed based on the generated three-dimensional surface scan. A damage report including the assessed damage is generated and transmitted to an interactive display interface of a computing system.

18 Claims, 9 Drawing Sheets

(51) Int. Cl.
  *G01S 17/894* (2020.01)
  *G01S 17/95* (2006.01)
  *G06Q 10/10* (2023.01)
  *G06Q 40/08* (2012.01)
  *G06T 17/05* (2011.01)
  *G06V 10/70* (2022.01)
  *G06V 20/17* (2022.01)
(52) U.S. Cl.
  CPC ............ *G06Q 10/10* (2013.01); *G06Q 40/08* (2013.01); *G06T 17/05* (2013.01); *G06V 10/70* (2022.01); *G06V 20/17* (2022.01)

(56) References Cited

U.S. PATENT DOCUMENTS

| | | |
|---|---|---|
| 2016/0070265 A1 | 3/2016 | Liu |
| 2018/0130196 A1 | 5/2018 | Loveland |
| 2018/0247416 A1 | 8/2018 | Ruda |
| 2020/0014816 A1* | 1/2020 | Speasl ................ H04N 1/00129 |

* cited by examiner

500

Review 3D Drone Scan
Address: 123 Main Street
Date of Assessment: January 1, 2020
Assessment: Potential Roof Damage / Hail Storm

| View 3D Map | Play Map Video |

Drone ID:  Robo-Drone-123           View Additional Drone Specs

Confirm Damage Assessment

Damage Assessment Computing Platform Estimate:
    Roof Damage $XX                Confirm   Edit
    Siding Damage $XX              Confirm   Edit
    Miscellaneous Damage $XX       Confirm   Edit
    Other:                         Enter Here View Policy Information        Y     N
Contact Claim Department       Y     N Next

FIG. 6

DAMAGE DETECTION AND ANALYSIS USING THREE-DIMENSIONAL SURFACE SCANS

CROSS-REFERENCE TO RELATED APPLICATIONS

This application claims priority to U.S. Provisional Patent App. No. 63/120,279, filed Dec. 2, 2020, and U.S. Provisional Patent App. No. 63/229,409, filed Aug. 4, 2021. The contents of these applications are incorporated herein in their entirety by reference for all purposes.

TECHNICAL FIELD

Aspects of the disclosure relate to detecting and analyzing three-dimensional surface scans. For example, three-dimensional surface scans may be used to assess and analyze damage that occurs to external features of buildings, homes, warehouses, manufacturing plants, retail stores, and other premises, as well as damage that occurs to other types of properties, such as vehicles, boats, airplanes, motorcycles, recreational vehicles, and the like.

BACKGROUND

Existing systems for detecting damage often rely on human detection of scope of the damage and/or low-resolution photographs that provide insufficient detail of a full scope of the damage. Such insufficient detail often results in an under or over assessment of the scope of the damage, thus potentially adding to costs of repair work to address such damage. Additionally, manual detection and communication process may introduce errors and delays in an effective response to mitigate damage, as well as safety considerations for personnel going to the site of the damage for assessment thereof.

SUMMARY

Aspects of the disclosure provide effective and efficient technical solutions that help to accurately detect and analyze damage conditions to external features of a premises based on three-dimensional scans of the premises or other types of properties. For example, three-dimensional scans of a premises may be obtained via drones or other unmanned aerial or ground vehicles that collect data for the generation of a three-dimensional map. As another example, Light Detection and Ranging (LIDAR) on a user device, such as a mobile computing device, may be used to scan an area of a premises and/or generate a three-dimensional map of the area based on the scan. Damage to the area may be assessed using an artificial intelligence engine.

In accordance with one or more embodiments, a computing platform may be configured to detect damage conditions to external features of a premises. In an example embodiment, an electronic damage assessment request related to the property is received. One or more autonomous drones are dispatched to a premises associated with the damage assessment request and capture sensor data associated with a surveyed area of the property. Based on the sensor data, a three-dimensional surface scan of the surveyed area of the property is generated. Damage to the property is assessed based on the generated three-dimensional surface scan. A damage report including the assessed damage is generated and transmitted to an interactive display interface of a computing system. In some embodiments, the damage assessment request comprises location information relating to the property. A geolocation of the property is determined based on the received location information and at least one of a global positioning sensor (GPS) signal and a location beacon signal received by a positioning sensor of the one or more autonomous drones. The one or more autonomous drones is navigated to the geolocation of the property. In some embodiments, the sensor data is compared to a threshold. The threshold is at least one of a water level threshold, a humidity threshold, a surface thinness threshold, and a topographical surface variation threshold. Based on comparing the sensor data to the threshold, a triggering event associated with the surveyed area is determined. The one or more autonomous drones captures additional sensor data in at least one additional physical location associated with the surveyed area, the at least one additional physical location being different from a physical location associated with the triggering event. In some embodiments, assessing damage to the property further comprises determining at least one damage element based on the sensor data, the at least one damage element comprising any of a damage type, damage location, and estimated cost to repair. In some embodiments, the sensor data comprises one or more digital images. The damage element is determined by executing a machine learning-based image recognition operation on the one or more digital images. In some embodiments, at least one of a repair job ticket and an insurance claim is generated based on the at least one damage element and electronically submitted to a remote computing system via the at least one communication interface. In some embodiments, a user-interactive video comprising the three-dimensional surface scan and identification information for the one or more autonomous drones is generated based on sensor data and, responsive to receiving a user input via the interactive display interface, a control on the interactive display interface plays back the user-interactive video.

In accordance with one or more embodiments, a computing platform may be configured to detect damage conditions to external features of a premises using a LIDAR scan. In an example embodiment, an electronic damage assessment request related to the property is received. The electronic damage assessment request comprises first location information. Based on second information provided by a mobile device comprising a LIDAR sensor associated with the computing platform, the mobile device is determined to be in a target spatial location corresponding to the first location information. Based on determining that the mobile device is in the target spatial location, a scan is initiated by the LIDAR sensor. Depth sensor data associated with a surveyed area of the property is received from the LIDAR sensor. Based on the depth sensor data, a three-dimensional surface scan of the surveyed area of the property is generated. Damage to the property is assessed based on the generated three-dimensional surface scan. A damage report including the assessed damage is generated and transmitted to an interactive display interface of a computing system. In some embodiments, a zoom-in area on the surveyed area of the property is determined based on the depth sensor data. Image data depicting the zoom-in area is received. Based on the depth sensor data and the image data, the three-dimensional surface scan of the surveyed area of the property is generated. In some embodiments, a machine learning-based image recognition operation is executed on the three-dimensional surface scan. At least one damage element is determined based on the executed image recognition operation, the at least one damage element comprising any of a damage type, damage location, and estimated cost to repair. In some embodiments, based on the at least one determined damage element, at least one of a repair job ticket and an insurance claim is generated and electronically submitted to a remote computing system via the at least one communication interface. In some embodiments, a virtual object is layered on the three-dimensional surface scan. In some embodiments, a sensed object on the three-dimensional surface scan is determined and removed. In some embodiments, a user-interactive video feed is generated. During the scan, a control on the interactive display interface plays back the user-interactive video feed. In some embodiments, the scan is a first scan. Responsive to receiving a user input via the interactive display interface, a second scan is initiated by the LIDAR sensor associated with the computing platform.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 5 and 6 depict illustrative user interfaces involved in detecting and analyzing damage conditions to external features of a premises using a drone or other unmanned aerial or ground vehicle device in accordance with one or more aspects of the present disclosure;

DETAILED DESCRIPTION

Figure 1:
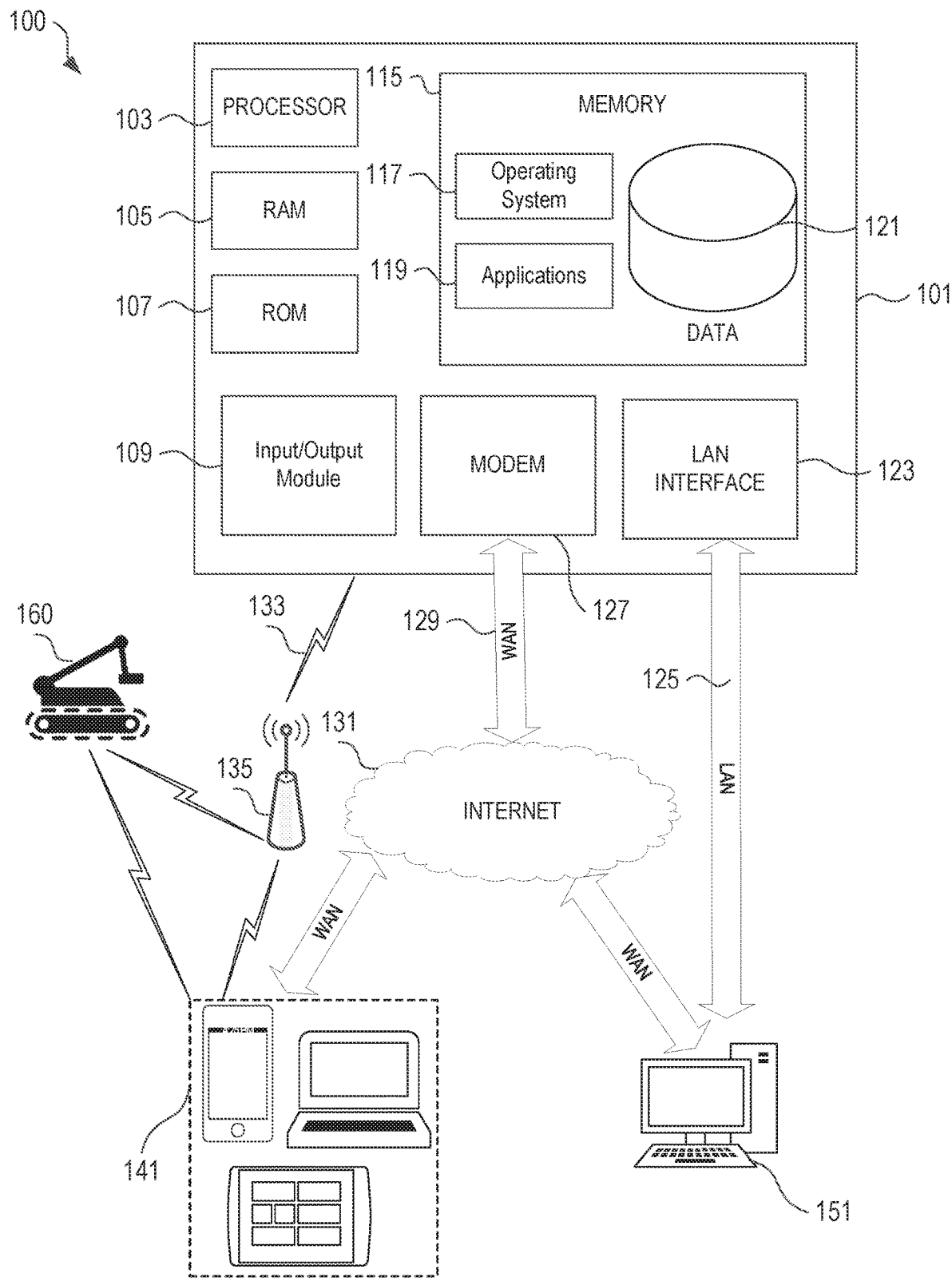
FIG. 1 illustrates a network environment and computing systems that may be used to implement aspects of the present disclosure.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

Some aspects of the disclosure relate to detection and analysis of damage to external features of a premises. A computing platform may receive a request to assess potential damage to a premises (e.g., a home, a warehouse, a public building, or some other premises) using sensor data captured from autonomous drones or other unmanned aerial or ground vehicles that may be dispatched to the premises upon receiving the request to assess potential damage. The computing platform may use recognition models to detect damage conditions from the received sensor data (e.g., based on data values captured by various sensors from the autonomous drones or other unmanned aerial or ground vehicles, and/or based on extraction and recognition of information from audio, video, images, or other media captured by the autonomous drones or other unmanned aerial or ground vehicles using object recognition, machine learning, and other similar techniques). In some examples, the captured data may be compared to a previously-obtained dataset of the same premises so as to compare the newly captured data to the previously-obtained dataset and to detect differences in features of the premises. The computing platform may then generate a map, e.g., a three-dimensional interactive map, of the surveyed area and assess damage to the premises based on information contained within the map. For example, in assessing damage to a roof of a building, one or more autonomous drones or other unmanned aerial or ground vehicles may capture data relating to topographical features and or structural aspects (e.g., thickness and/or brittleness of roof shingle, depth of damage to a roof structure, broken window, missing siding, or the like) to assess damage to the roof.

Further aspects of the disclosure relate to formulating a response plan for a damage condition. A computing platform may store "playbook" templates for responding to various conditions and/or performing various actions (e.g., a roof damage playbook, a water damage mitigation playbook, etc.) that may be selected based on a detected damage condition. The computing platform may use the selected templates to generate a response plan containing specific action items based on one or more identified areas of the damage condition, a type and severity of the damage condition, and other variables that may be relevant to the specific damage condition.

FIG. 1 illustrates a block diagram of a damage detection and analysis computing device 101 in a networked operating environment 100 that may be used according to one or more illustrative embodiments of the disclosure. The damage detection and analysis computing device 101 may have a processor 103 for controlling overall operation of the damage detection and analysis computing device 101 and its associated components, including RAM 105, ROM 107, input/output module 109, and memory unit 115. The damage detection and analysis computing device 101, along with one or more additional devices (e.g., devices 141, 151) may correspond to any of multiple systems or devices, such as a damage detection and analysis computing devices or systems, configured as described herein for transmitting and receiving damage-related data (e.g., photographs, videos), generating three-dimensional maps using the damage-related data, analyzing the three-dimensional maps, determining aspects related to damage to the premises, and triggering one or more damage mitigation or repair actions. Damage-related data can include data collected from one or more autonomous drones 160, e.g., unmanned ground vehicle (UGVs) or unmanned aerial vehicles (UAVs).

Input/Output (I/O) 109 may include a microphone, keypad, touch screen, and/or stylus through which a user of the damage detection and analysis computing device 101 may provide input, and may also include one or more of a speaker for providing audio input/output and a video display device for providing textual, audiovisual and/or graphical output. Software may be stored within memory unit 115 and/or other storage to provide instructions to processor 103 for enabling damage detection and analysis computing device 101 to perform various functions. For example, memory unit 115 may store software used by the damage detection and analysis computing device 101, such as an operating system 117, application programs 119, and an associated internal database 121. The memory unit 115 includes one or more of volatile and/or non-volatile computer memory to store computer-executable instructions, data, and/or other information. Processor 103 and its associated components may allow the damage detection and analysis computing device 101 to execute a series of computer-readable instructions to perform steps including receiving a damage assessment request, dispatching a drone or other unmanned aerial or ground vehicle to a premises for assessment of damage, receiving data from the drone or other unmanned aerial or ground vehicle resultant from surveying one or more areas of the premises, generating a three-dimensional map of the surveyed one or more area, and assessing a damage amount to damage to the premises based on the three-dimensional map.

The damage detection and analysis computing device 101 may operate in a networked environment 100 supporting connections to one or more remote computers, such as devices 141 and 151. Damage detection and analysis computing device 101, and related devices 141 and 151, may include devices installed in drones or UGVs or UAVs that are configured to survey an area and collect data related to the surveyed area. Thus, the damage detection and analysis computing device 101 and devices 141 and 151 may each include personal computers (e.g., laptop, desktop, or tablet computers), servers (e.g., web servers, database servers), drone-based devices (e.g., specialized hardware devices for receiving and processing driver data, on-board vehicle computers, short-range vehicle communication systems, and the like), or mobile communication devices (e.g., mobile phones, portable computing devices, and the like), and may include some or all of the elements described above with respect to the damage detection and analysis computing device 101. The network connections depicted in FIG. 1 include a local area network (LAN) 125 and a wide area network (WAN) 129, and a wireless telecommunications network 133, but may also include other networks. When used in a LAN networking environment, the damage detection and analysis computing device 101 may be connected to the LAN 125 through a network interface or adapter 123. When used in a WAN networking environment, the damage detection and analysis computing device 101 may include a modem 127 or other methods for establishing communications over the WAN 129, such as network 131 (e.g., the Internet). When used in a wireless telecommunications network 133, the damage detection and analysis computing device 101 may include one or more transceivers, digital signal processors, and additional circuitry and software for communicating with one or more autonomous drones 160 and/or wireless computing devices 141 (e.g., mobile phones, short-range vehicle communication systems, other mobile devices) via one or more network devices 135 (e.g., base transceiver stations) in the wireless network 133. In some instances, the one or more autonomous drones 160 may capture data locally, e.g., to a card module on the device for instances in which there is no signal uplink.

It will be appreciated that the network connections shown are illustrative and other methods for establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and real-time driver analysis system components described herein may be configured to communicate using any of these network protocols or technologies.

Additionally, one or more application programs 119 used by the damage detection and analysis computing device 101 may include computer executable instructions for transmitting and receiving vehicle driver data, analyzing vehicle driver data, determining aspects related to a driver distraction level, triggering distracted driving actions, and performing other related functions as described herein.

Figure 2:
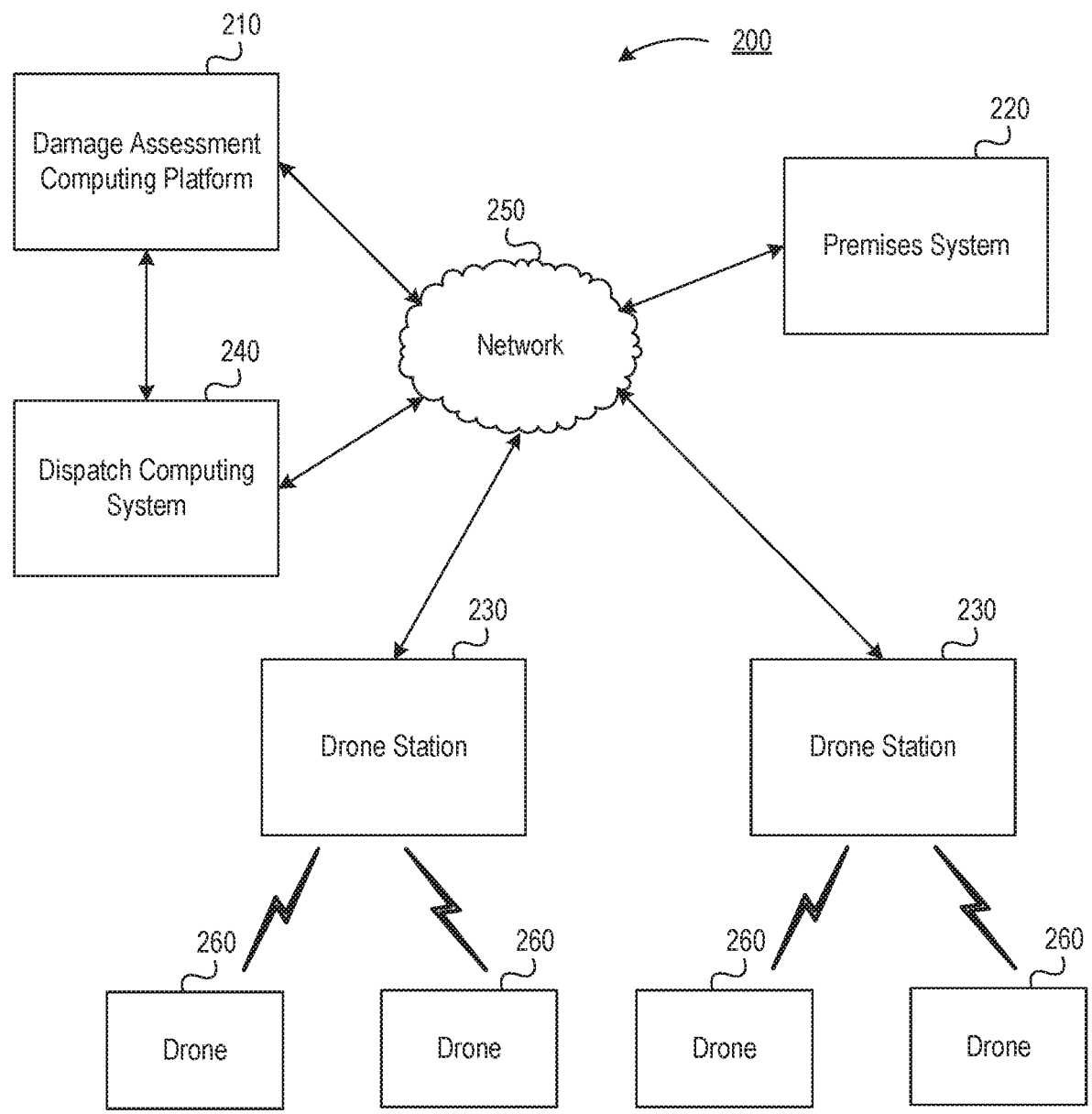
FIG. 2 illustrates an operating environment for detecting and analyzing damage conditions to external features of a premises using a drone or other unmanned aerial or ground vehicle device in accordance with one or more aspects of the present disclosure.

FIG. 2 depicts an illustrative networked operating environment 200 for detecting and analyzing damage conditions at a premises, which may be similar to the network operating environment 100 illustrated in FIG. 1. Referring to FIG. 2, networked operating environment 200 may include a damage assessment computing platform 210, a premises system 220, one or more drone stations 230, a dispatch computing system 240, and one or more autonomous drones 260. The damage assessment computing platform 210, one or more drone stations 230, premises system 220, and dispatch computing system 240 may be connected by a network 250, which may include a public network (e.g., the Internet) and/or a private network, each of which may include one or more wired networks and/or one or more wireless networks. In addition, the drone stations 230 may communicate with the drones 260 using wireless communications as the drones move about the premises. Each of the damage assessment computing platform 210, one or more drone stations 230, premises system 220, and dispatch computing system 240, may be special purpose computing devices configured to perform specific functions, as described below, and may include specific computing components such as processors, memories, communication interfaces, and/or the like.

The damage assessment computing platform 210 may include components and/or be configured to perform functions similar to damage detection and analysis computing device 101 of FIG. 1. For example, the damage assessment computing platform 210 may be configured to control or manage aspects of a damage detection and analysis service, including detecting damage conditions, collecting drone data relating to the damage conditions, generating a three-dimensional map of damage conditions based on the collected drone data, communicating with the premises system 220, and controlling the drones 260. The drone stations 230 may be configured to wirelessly communicate with the drones 260, and may further include docking stations and/or charging facilities to which the drones 260 may return when not in use. The premises system 220 may be configured to monitor and control security and automation functions of a premises, and may connect to, comprise, and/or control sensors (e.g., cameras, GPS, air pressure sensors, water leak sensors, and the like). Although the premises system 220 is described herein as a unitary system, in some embodiments a security system and a home automation system may be separated. A dispatch computing system 240 may be configured to provide interfaces for reviewing data received by and determinations made by the damage assessment computing platform 210, as well as providing communication functions to communicate with damage assessment personnel and/or claims adjusters. The damage assessment computing platform 210 may communicate with the dispatch computing system 240 via the network 250 and/or via other links (e.g., via a telephone link or other link).

In some embodiments, the premises system 220 may monitor the premises and may detect one or more conditions associated with potential damage to the premises. If the premises system 220 detects a condition associated with potential damage, it may send data associated with the potential damage condition to the damage assessment computing platform 210. For example, the data may indicate the type of sensor that detected the potential damage condition and any sensor data captured by that sensor and/or other (e.g., nearby) sensors. Additionally or alternatively, the premises system 220 may continually send sensor data regardless of whether potential damage condition has been detected or not. In some cases, the damage assessment computing platform 210 may receive high bandwidth data (e.g., high-resolution video data) from the premises system 220 when a potential damage condition is detected, but may receive lower bandwidth data (e.g., sensor readings, audio data, image data, low-resolution video data, or the like) continuously and/or at regular intervals from the premises system 220.

The damage assessment computing platform 210 may include a processor, memory, and a communication interface. The processor may control operations of the damage assessment computing platform 210, and the memory may store instructions that, when executed by processor, cause the damage assessment computing platform 210 to perform one or more functions. The communication interface may include one or more wired and/or wireless network interfaces, and the communication interface may connect the damage assessment computing platform 210 to one or more networks (e.g., network 250) and/or enable the damage assessment computing platform 210 to exchange information and/or otherwise communicate with one or more devices connected to such networks. The memory may store and/or otherwise provide a premises map database, a premises security database, one or more object recognition model(s), and/or a playbook database. The premises map database may store one or more maps associated with one or more premises. The premises security database may store information about security sensors and automated devices located at one or more premises. The object recognition model(s) may be used to recognize particular objects appearing in images or video captured by the drones 260. The playbook database may contain "playbook" templates indicating what actions should be taken in response to certain damage conditions, e.g., where damage to a premises is so severe that the integrity of the drone 260 to continue surveying the premises is compromised. In some embodiments, the damage assessment computing platform 210 may be carried onboard an autonomous drone 260 and/or may be integrated with a drone station 230.

The autonomous drones 260 may be the same as or similar to drones 160 of FIG. 1 and may include one or more unmanned aerial vehicles, unmanned ground vehicles, or the like. In some examples, the drones 260 may include one or more unmanned aerial vehicles and/or one or more unmanned ground vehicles. The autonomous drones 260 may be configured to perform various functions, including exploring a premises, capturing data, e.g., photographic data, video data, on the premises, communicating the data to the damage assessment computing platform 210 (e.g., via a drone station 230), moving towards a location of potential damage at a premises and capturing sensor data about the potential damage condition. The drones 260 may be equipped with various sensors to capture sensor data and various equipment to interact with other devices involved in the damage detection and analysis, as further described below. In some instances, drones 260 may include flying drones used for damage assessment, which may be capable of being manually flown by approved operators. The drones 260 may take and collect images of a premises of various resolutions. In order to obtain images with resolution sufficient to show small damage, land drones may be used. In that regard, in some instances, drones 260 may include a ground (e.g., treaded or wheeled drone that may function like an autonomous vehicle without being manually driven by an operator. For example, a drone 260 may be placed on the roof to automatically scan as much data possible without operator assistance.

Figure 3:
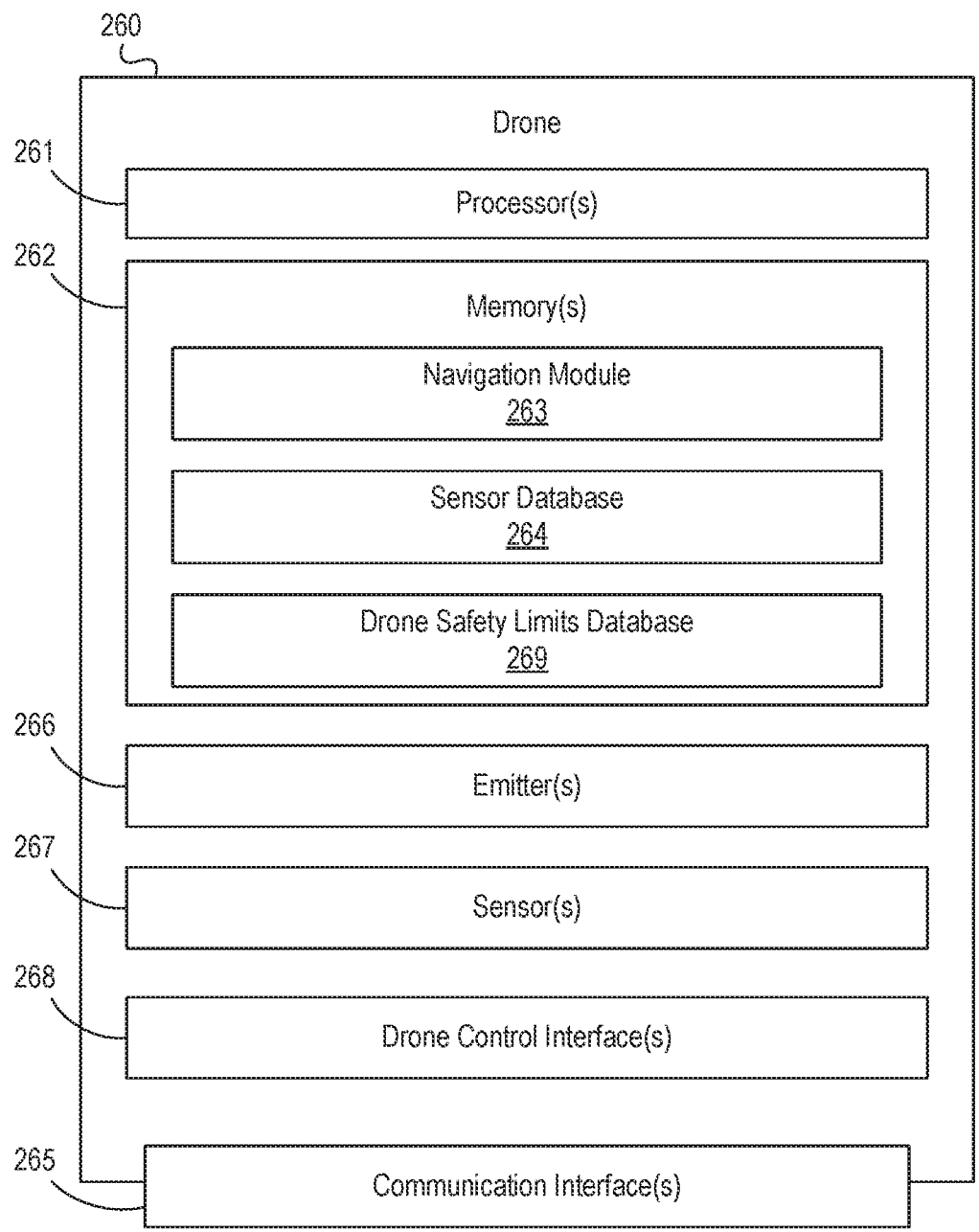
FIG. 3 illustrates an operating environment for a drone or other unmanned aerial or ground vehicle device for detecting and analyzing damage conditions to external features of a premises in accordance with one or more aspects of the present disclosure.

Referring to FIG. 3, a drone 260 may include a processor 261, memory 262, and a communication interface 265. Processor 261 may control operations of the drone 260, and memory 262 may store instructions that, when executed by processor 261, cause the drone 260 to perform one or more functions. Communication interface 265 may include one or more wireless network interfaces, and communication interface 265 may connect the drone 260 to the drone stations 230. Memory 262 may store and/or otherwise provide a navigation module 263, a sensor database 264, and a drone safety limits database 269. The navigation module 263 may allow the drone to carry out navigation commands, avoid obstacles, and the like. The sensor database 264 may store information captured by the sensors 267. The drone safety limits database 269 may contain information about sensor conditions that may damage or destroy the drone 260 (e.g., very high temperatures).

The drone 260 also may include emitters 266, sensors 267, and a drone control interface 268. Emitters 266 may include audio speakers for playing audio messages, and/or may include lasers, projectors, or other light emitters for pointing to and/or designating exits and routes, and the like. Sensors 267 may sense conditions such as temperature, smoke, carbon monoxide, radiation, depth measurement, density, and the like, and may also include cameras (e.g., image and/or video cameras for the collection of visual photographs, two-dimensional, and/or 360-degree high-definition videos) and microphones. Such data collected via sensors 267 may include temperature data, indication of the presence of smoke, depth sensors, carbon monoxide, radiation, or other such data, as well as audio, images and videos. Sensors 267 may also include positioning sensors such as GPS sensors as well as radar, sonar, infrared, LIDAR, and the like. Drone control interfaces 268 may allow interaction with drone mobility hardware such as wheels, treads, legs, rotor(s) (e.g., for a flying drone), and the like.

Figure 4:
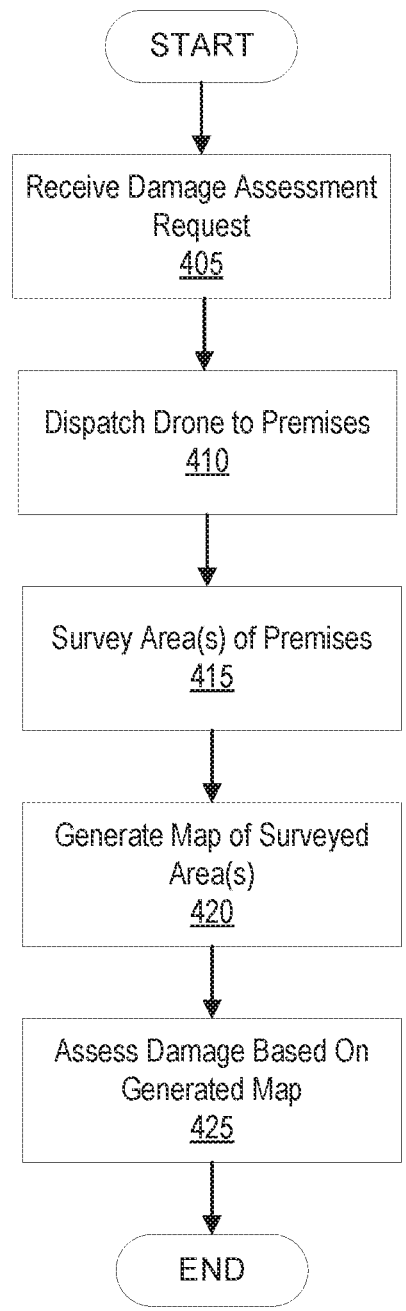
FIG. 4 illustrates a method for detecting and analyzing damage conditions to external features of a premises using a drone or other unmanned aerial or ground vehicle device in accordance with one or more aspects of the present disclosure.

FIG. 4 depicts an illustrative method for using autonomous drones to detect and analyze damage conditions at a premises. At step 405, the damage assessment computing platform 210 may receive a damage assessment request, e.g., from a client-side computing device. The damage assessment request may include information relating to the property, e.g., address, premises type, location descriptors of the potential damage, a damage type identification, premises owner or resident information, insurance policy information associated with the premises, and the like. Upon receiving the damage assessment request, the damage assessment computing platform 210 may verify one or more components of information provided with the damage assessment request. If any errors are noted, or if a key information component has been omitted, the damage assessment computing platform 210 may send a prompt to the client-side computing device from which the damage assessment request originated, where the prompt may include missing or potentially erroneous information component(s) and prompt a user to re-enter such information component(s).

Subsequently, at step 410, the damage assessment computing platform 210 may dispatch one or more drones to the premises. In some embodiments, dispatching one or more drones may include transmitting one or more instructions to the drone station 230, the drone station 230 subsequently determining one or more autonomous drones suitable for surveying the potential damage, e.g., based on information provided with the damage assessment requests, and determining suitable data to be obtained in surveying the premises associated with the damage assessment request.

At step 410, the one or more drones 260 may proceed to the potential damage location as instructed. The drones 260 may move (e.g., by walking, driving, flying, etc.) towards the potential damage location, passing through doors and/or windows as necessary, and/or advancing up one or more stories of the premises. If the drones have the ability to open doors autonomously, they may do so (e.g., by sending commands via short-range wireless signals, by physically manipulating door controls, etc.). While the drones 260 are moving towards the potential damage location, the drones 260 may continually capture sensor data. In some instances, sensors in the drones 260 may be activated or initiated to capture data based on a triggering event, such as a water level threshold, a humidity threshold, and surface thinness threshold, a topographical surface variation threshold, and the like. Upon such a triggering event occurring, sensors in the drone 260 may capture data to be sent to damage assessment computing platform 210 for further analysis and assessment. During a potential damage condition, the drones 260 may compare the captured sensor data to drone safety limits (which may be stored in the drone safety limits database 269). For example, the drone 260 may monitor a temperature as it moves towards the damage location. If the measured temperature exceeds a threshold (e.g., a temperature that may damage the drone), the drone may interrupt the route and move towards a lower temperature area, and notify the damage assessment computing platform 210 of the exceeded safety limit. The damage assessment computing platform 210 may then calculate a new route and/or other new instructions for the drone.

Upon being dispatched to the premises, at step 415, the one or more autonomous drones 260 may survey one or more areas of the premises for detection and analysis of a damage condition in accordance with the damage assessment request. In some examples, the one or more of the drones 260 may initially map a premises by exploring the premises and capturing sensor data while they explore. The drones 260 may execute an exploration algorithm (e.g., using navigation module 263) to survey the premises by starting from a drone station 230, using sensors to detect the surrounding environment, and attempting to navigate around any obstacles or structures detected. An example algorithm used by navigation module 263 may be a surface gradient-following algorithm while surveying the roof of a premises. In this way, the drones may proceed throughout one or more designated areas of a premises. The drones may use position data (e.g., based on GPS signals and/or local beacon signals) and/or generate models of the premises in order to ensure that all pertinent areas of the premises are explored. In some embodiments, the drones may continually communicate positioning sensor data (e.g., high and low resolution image data, LIDAR data, infrared data, sonar data, and/or the like) to the drone station 230 and/or the damage assessment computing platform 210, which in turn may generate the models (e.g., three-dimensional models) of the premises for exploration purposes and communicate the models back to the drones.

The drones 260 may upload some or all of the captured sensor data to the damage assessment computing platform 210 in order for the damage assessment computing platform 210 to generate a three-dimensional map of the premises. The drones 260 may communicate wirelessly with the drone stations 230, which may in turn communicate with the damage assessment computing platform 210 (e.g., via network 250) as illustrated at FIG. 2. However, other embodiments may use different network topologies to connect the drones 260 to the damage assessment computing platform 210.

At step 415, the drones 260 may capture sensor data in the area of the potential damage condition. In some instances, one or more sensors in the drones 260 may be activated or initiated to capture data based on a triggering event, such as a water level threshold, a humidity threshold, and surface thinness threshold, a topographical surface variation threshold, and the like. Upon such a triggering event occurring, the one or more sensors in the drone 260 may capture data to be sent to damage assessment computing platform 210 for further analysis and assessment. The drones 260 may autonomously move around the potential damage location and/or areas nearby to the potential damage location in order to capture sensor data in various locations that may help to determine the extent of the potential damage condition, if the potential damage condition is changing or ongoing, the like. The drones 260 may continuously and/or periodically upload the captured sensor data to the damage assessment computing platform 210 (e.g., via the drone stations 230) for analysis of the sensor data. For example, in survey a roof of a premises for detection of potential roof damage, the drones 260 may conduct one or more structural tests to one or more areas of the roof, such as a brittleness test, a single thickness test, and the like.

At step 420, after the captured premises data has been uploaded to the damage assessment computing platform 210, the damage assessment computing platform 210 may generate a map of the premises. The generated map may include a two-dimensional map and/or a three-dimensional map of the premises generated based on the captured sensor data. The sensor data may indicate (e.g., using LIDAR, radar, sonar, image/video data, positioning data, or the like) a general topography of the premises as well as where obstacles appear in the premises, e.g., chimneys, vents, skylights, flashing, gutters on a roof of a premises, thickness of shingles, possible age and/or fidelity of the roof. The damage assessment computing platform 210 may use two-dimensional and/or three-dimensional reconstruction techniques to generate models of the premises, which may be converted to and/or used as the maps. Using such techniques, the damage assessment computing platform 210 may determine depth data from multiple two-dimensional images (e.g., using triangulation techniques), from three-dimensional images captured by multiple cameras onboard the drones, and/or from captured sensor data such as LIDAR/sonar/radar data, and use such depth data to generate the models.

The damage assessment computing platform 210 may further generate maps that contain indications of other sensor readings. Thus the two-dimensional and/or three-dimensional maps may include sensor readings for various locations in the premises. For example, the sensor readings captured by the drones may indicate that a location within a surveyed area was measured to have an anomalous change in topography, e.g., due to roof damage. Such indications may be stored in the map for multiple sensor data.

In some cases, the drones may capture and upload multiple sets of sensor data for the premises (e.g., step 415 may be repeated) at various times (e.g., different times of day) and/or in various conditions (e.g., various weather conditions). The damage assessment computing platform 210 may use the multiple sets of data to average out temporary fluctuations in data in order to generate a more accurate map. In one example, the damage assessment computing platform 210 may use such data to remove from the map obstacles that do not appear in every set of data, which may correspond to temporary objects, or even people or animals. Additionally or alternatively, the damage assessment computing platform 210 may thus obtain ranges of normal sensor data and store such ranges within the map.

The generated map may be tagged with topographical data for easier review of the map. The damage assessment computing platform 210 may determine edges or end points of an area, e.g., of a roof, automatically and assign perimeters to one or more designated areas. The automatically assigned perimeter may be based on qualities associated with the area that may be determined by the damage assessment computing platform 210 automatically (e.g., edges of the roof, points of changing slope of the roof, etc.). Additionally or alternatively, more descriptive names (e.g., north-facing roof portion, etc.) may be assigned (e.g., by a human reviewer).

At step 425, the damage assessment computing platform 210 may assess damage to the premises based on the map generated by the drone data. In some examples, the damage assessment computing platform 210 may analyze the sensor data and/or other premises data in order to assess a scope of damage to the premises. Assessing the damage at step 425 may include identifying one or more steps to mitigate and/or repair damage to designated areas of the premises. Assessing the damage at step 425 may include transmitting a damage report to a display interface that includes an assessed damage condition, as will be described in greater detail below.

The damage assessment computing platform 210 may analyze video and/or image data using one or more recognition models trained to detect situations associated with a damage condition, e.g., dents, ruptures, leaks, tears, or the like in the roof surface. For example, one of the recognition models may be trained to recognize the presence of a dent in a surface image. Therefore, the damage assessment computing platform 210 may input video and/or image data received from the premises into the recognition model trained using techniques such as machine learning to recognize a damage condition, e.g., a hail-related damage condition to a roof, and if an output of the recognition model indicates a presence of damage, the damage assessment computing platform 210 may detect a damage condition. The recognition model and/or other recognition models may be trained to recognize other damage conditions from images and/or video, such as water damage or fire damage. Other models may be trained to recognize other damage conditions from images and/or video, such as severe weather, water flooding, pipe bursts, or other such indications of potential property damage conditions. The damage assessment computing platform 210 may also analyze other sensor data using one or more recognition models. For example, the damage assessment computing platform 210 may capture temperature data, pressure data, and other such sensor data and analyze it using recognition models trained to detect damage conditions.

The damage assessment computing platform 210 may have previously trained one or more recognition models using a training data set consisting of various images and/or videos, audio data, and/or other sensor data, some of which are associated with a particular damage condition and some of which are not. The training data set may further correlate with target variable(s) indicating whether each data item (e.g., image, video, audio, sensor data, etc.) is associated with a particular damage condition or not. The damage assessment computing platform 210 may use one or more statistical and/or machine learning techniques to develop the object recognition models using the training data set. In this way, the object recognition models may be trained to recognize damage conditions based on various sensor data. In some cases, the model may be trained to detect anomalies related to abnormal data and/or sensor readings.

In some cases, the damage assessment computing platform 210 may compare received imagery (e.g., still images or video received from the drones 260) to previously-recorded images and/or maps generated. For example, upon enrolling in a premises protection program or insurance plan, a drone 260 may be dispatched to the premises to take an initial survey of the premises. The initial survey may include various information components relating to the premises, such as an age of one or more components of the premises, repair history, previous damage indications, and the like. Significant differences between the received images and the previous images or map may indicate that damage to the premises has occurred. The damage assessment computing platform 210 may directly compare images (e.g., after performing warping to account for location and/or perspective shifts) and/or generate a map from the received imagery to compare to the initially-generated map. Thus, the map generated at step 420 may be a second map (or third map or so on) generated according to the techniques described herein and compared to an initially-generated map. Significant differences may indicate a condition comprising damage to the premises.

In some cases, the damage assessment computing platform 210 may compare sensor data to one or more sensor levels and/or ranges stored in the initially-generated map. If certain sensor data exceeds certain levels and/or varies by a certain amount from the sensor data stored in the initially-generated map, a damage condition may be detected. For example, if the map indicates that a location within a premises has a rapid topographical variation that was not previously detected, then a detection of such a variation may tend to indicate a damage condition. In some cases, such a detection of an anomalous sensor reading may be insufficient to trigger damage condition, but multiple such anomalous readings may cause the damage assessment computing platform 210 to detect a damage condition.

The damage assessment computing platform 210 may additionally or alternatively analyze event data received from the premises system 220. Such event data may indicate, for example, whether a water leak detector was triggered. Some events may automatically lead to detection of a damage condition with no further analysis (e.g., activation of an "alarm" button). Some events may cause the damage assessment computing platform 210 to receive additional data for analysis. For example, a water leak detector being triggered may cause the damage assessment computing platform 210 to request (and/or the premises system 220 to automatically send) high-resolution video data and the like to the damage assessment computing platform 210 if the damage assessment computing platform 210 was not already receiving such data from the premises system 220. The damage assessment computing platform 210 may then analyze the additional data to detect whether a potential damage condition is present or not (e.g., whether there was a false alarm due to a faulty sensor or the like). For example, the damage assessment computing platform 210 may analyze video data to detect whether other signs of a potential damage condition exist as described above.

As part of assessing damage to the premises at step 425, the damage assessment computing platform 210 may determine one or more areas associated with the damage condition. The damage assessment computing platform 210 may extract location information from the sensor data that was used to detect the damage condition. Additionally or alternately, the damage assessment computing platform 210 may refer to the generated map, which may indicate where devices (e.g., devices of the premises system 220) are located. Additionally or alternatively, the damage assessment computing platform 210 may compare received images and/or video associated with the damage condition to the generated map (e.g., if the map includes a generated three-dimensional model) in order to determine a location of the images and/or video. The damage assessment computing platform 210 may determine one or more areas associated with the damage condition based on various location(s) extracted from the sensor data and/or determined based on the sensor data.

In some instances, the damage assessment computing platform 210 and/or the dispatch computing system 240 may confirm that the damage condition exists. In some cases, a trained human operator (e.g., a dispatcher) may review the captured sensor data (including audio/video/image data and/or other sensor data) associated with the damage condition, other sensor data, and/or location data and confirm whether a damage condition exists. The damage assessment computing platform 210 may therefore transmit the sensor data associated with the damage condition (e.g., the sensor data on which the detection of the damage condition was based) and the location data (e.g., based on the generated map of the premises) to another computing system (e.g., the dispatch computing system 240) for review. The damage assessment computing platform 210 may also transmit other sensor data, such as data from sensors located in the same area as the sensors that picked up the damage condition, sensors within a threshold distance of the location of the damage condition, and the like for review and confirmation of the damage condition. The damage assessment computing platform 210 may automatically confirm which damage conditions are present based on sensor data in conjunction with confidence intervals and one or more thresholds specific to a type of damage condition.

The damage assessment computing platform 210 and/or the dispatch computing system 240 may generate, send, and/or otherwise provide one or more user interfaces populated with sensor and location data for review by the operator, e.g., an adjustor who may be located remotely from the premises. FIG. 5 illustrates an example user interface 500 for providing sensor data for review. The user interface 500 may include information identifying the premises that was assessed (e.g., an address), information identifying date and/or timing of the assessment, and/or information identifying a type of potential damage related to the assessment, as illustrated. A two-dimensional or three-dimension video and/or a map video may be generated by damage assessment computing platform 210 based on the sensor data from one or more areas of the premises associated with the potential damage condition. In addition to or as an alternative to the display of a picture or video of the generated map, the user interface may display an interactive map with one or more selectable indicators within the map that provide additional information relating to surveyed information within the map (not illustrated). The user interface 500 may display detected sensor data (e.g., image and/or video data as illustrated), and/or previous sensor readings and/or ranges for comparison. Such a display may allow a reviewer to determine if the sensor data is abnormal for the premises. The user interface 500 may display video and/or image data captured nearby the location of the damage condition (e.g., video from a drone and a camera near an area of identified damage). The user interface 500 may further display controls for interacting with video, image, audio, and other sensor data (e.g., zoom, pan, play, and pause controls for interacting with image or video data). The user interface 500 may also display information relating to the one or more drones (e.g., identification number, model number, model specifications, and the like) that conducted the survey of the property in assessing a potential damage condition, as illustrated.

Additionally or alternatively, the damage assessment computing platform 210 and/or dispatch computing system 240 may display information about a determined damage condition, and may provide controls for confirming and/or responding to the damage condition. The example user interface 600 of FIG. 6 includes several estimates of the determined damage condition for various areas of a premises. For example, the user interface 600 may include a listing of various areas of the premises where damage was identified, an estimated cost to repair the identified damage, and one or more selectable elements for a reviewer to confirm or edit the provided estimates. Additionally, the damage assessment computing platform 210 may also allow a reviewer to input a manual determination that another damage condition is present. The reviewer may select more than one damage condition (e.g., when multiple conditions are present). The user interface 600 may additionally or alternatively allow the viewer to view policy information related to the subject premises and/or to contact a claim department associated with the damage assessment.

As part of step 425, the damage assessment computing platform 210 may determine a response plan for responding to the one or more damage condition. The response plan may be tailored to the selected one or more damage conditions. For example, based on or more settings associated with the premises, the damage assessment computing platform 210 may submit a claim for the one or more damage conditions. In some instances, the damage assessment computing platform 210 may initiate a job ticket to initiate repair work to the premises. For each detected damage condition, the damage assessment computing platform 210 may activate certain responses, some of which may be dependent on each other. Many damage conditions may also call for mitigation techniques (e.g., deactivating one or more devices prone to failure due to the identified damage), which may be specific to the damage condition. The damage assessment computing platform 210 may store "playbooks," which may be templates indicating which actions should be taken in response to a given damage condition.

The damage assessment computing platform 210 may coordinate with a reviewer (e.g., at dispatch computing system 240) to confirm and/or modify the response plan. For example, the damage assessment computing platform 210 may send the response plan to the reviewer, and receive changes and/or a modified response plan in return. In some cases, the damage assessment computing platform 210 may begin executing the response plan before receiving review and feedback on the response plan, as will be described below. The damage assessment computing platform 210 may then begin executing the modified/approved response plan after receiving confirmation from the reviewer.

A user (e.g., a reviewer) may access a user interface and edit the response plan as appropriate. For example, the user may modify an order in which the action items will be executed, assign or adjust priorities associated with the items, adjust details of the items (e.g., changing a location associated with an action item, adding a location to the action item, etc.). The reviewer may also add or delete items. The reviewer may then confirm the response plan via the user interface. The damage assessment computing platform 210 may receive the confirmed response plan (e.g., from the dispatch computing system 240) and begin executing the confirmed response plan.

In some instances, the damage assessment computing platform 210 and/or the dispatch computing system 240 may establish a communication with a damage repair system in order to inform premises repair personnel of the damage condition and request repair work. A human operator may communicate with the repair personnel and/or the communication may be automated. In some cases, the damage assessment computing platform 210 and/or the dispatch computing system 240 may provide sensor data (e.g., video data, image data, and the like) to the damage repair system so that the repair personnel may be better informed of the nature and extent of the damage condition. The damage assessment computing platform 210 and/or the dispatch computing system 240 may also inform the repair personnel of the response plan and/or coordinate with the repair personnel to further modify the response plan.

In some instances the damage assessment computing platform 210 may receive an indication that repair personnel is on site. The dispatch computing system 240 may transmit such an indication to the damage assessment computing platform 210. A dispatcher may be monitoring the repair personnel's position using data received from the damage repair system. The data may further indicate a status of repair work to the premises and/or any updates to the response plan.

Figure 7:
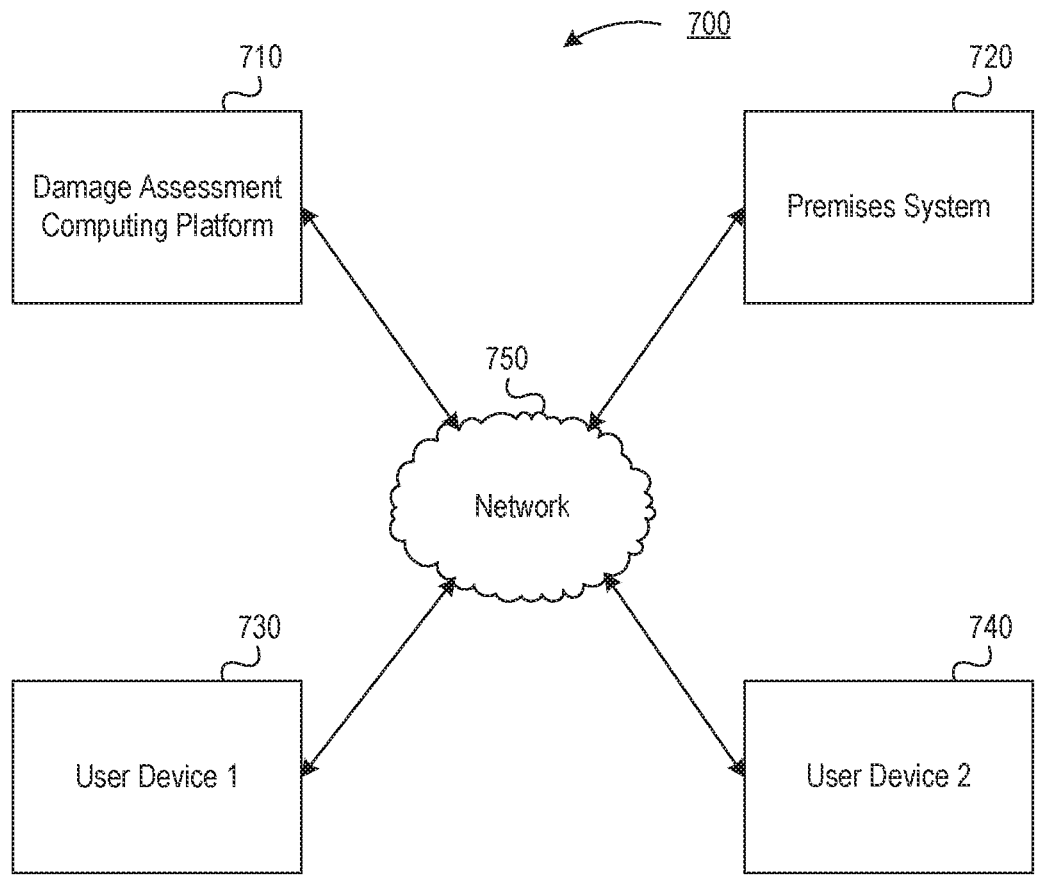
FIG. 7 illustrates an operating environment for detecting and analyzing damage conditions to external features of a premises using a sensor in a user device in accordance with one or more aspects of the present disclosure.

FIG. 7 depicts an illustrative networked operating environment 700 for detecting and analyzing damage conditions at a premises, which may be similar to the network operating environment 100 illustrated in FIG. 1. Referring to FIG. 7, networked operating environment 700 may include a damage assessment computing platform 710, a premises system 720, and one or more user devices, such as a first user device 730 and a second user device 740. The damage assessment computing platform 710, premises system 720, first user device 730, and second user device 740 may be connected by a network 750, which may include a public network (e.g., the Internet) and/or a private network, each of which may include one or more wired networks and/or one or more wireless networks. In addition, the first user device 730 and the second user device 740 may communicate with the damage assessment computing platform 710 and the premises system 720 using wireless communications. Each of the damage assessment computing platform 710, the premises system 720, the first user device 730, and the second user device 740 may be special purpose computing devices configured to perform specific functions, as described below, and may include specific computing components such as processors, memories, communication interfaces, and/or the like.

The damage assessment computing platform 710 may include components and/or be configured to perform functions similar to damage detection and analysis computing device 101 of FIG. 1 and/or the damage assessment computing platform 210 of FIG. 2. For example, the damage assessment computing platform 710 may be configured to control or manage aspects of a damage detection and analysis service, including detecting damage conditions, collecting sensor data relating to the damage conditions, generating a three-dimensional map of damage conditions based on the collected sensor data, and communicating with the premises system 720, the first user device 730, and the second user device 740. The premises system 720 may include components and/or be configured to perform functions similar to premises system 220 FIG. 2. For example, the premises system 720 may be configured to monitor and control security and automation functions of a premises, and may connect to, comprise, and/or control sensors (e.g., cameras, GPS, air pressure sensors, water leak sensors, and the like). Although the premises system 720 is described herein as a unitary system, in some embodiments a security system and a home automation system may be separated. The first user device 730 and the second user device 740 may be configured to provide interfaces for reviewing sensor data and related scans performed by one or more sensors provided with the respective user device. The first user device 730 and the second user device 740 may also be configured to provide interfaces for reviewing analyses and determinations made by the damage assessment computing platform 710, as well as providing communication functions to communicate with damage assessment personnel and/or claims adjusters. The damage assessment computing platform 710 may communicate with the first user device 730 and the second user device 740 via the network 750 and/or via other links (e.g., via a telephone link or other link).

Similar to the premises system 220 of FIG. 2, the premises system 720 of FIG. 7 may, in some embodiments, monitor the premises and may detect one or more conditions associated with potential damage to the premises. If the premises system 720 detects a condition associated with potential damage, it may send data associated with the potential damage condition to the damage assessment computing platform 710. For example, the data may indicate the type of sensor that detected the potential damage condition and any sensor data captured by that sensor and/or other (e.g., nearby) sensors. Additionally or alternatively, the premises system 720 may continually send sensor data regardless of whether potential damage condition has been detected or not. In some cases, the damage assessment computing platform 710 may receive high bandwidth data (e.g., high-resolution video data) from the premises system 720 when a potential damage condition is detected, but may receive lower bandwidth data (e.g., sensor readings, audio data, image data, low-resolution video data, or the like) continuously and/or at regular intervals from the premises system 720.

Similar to the damage assessment computing platform 210 of FIG. 2, the damage assessment computing platform 710 of FIG. 7 may include a processor, memory, and a communication interface. The processor may control operations of the damage assessment computing platform 710, and the memory may store instructions that, when executed by processor, cause the damage assessment computing platform 710 to perform one or more functions. The communication interface may include one or more wired and/or wireless network interfaces, and the communication interface may connect the damage assessment computing platform 710 to one or more networks (e.g., network 750) and/or enable the damage assessment computing platform 710 to exchange information and/or otherwise communicate with one or more devices connected to such networks. The memory may store and/or otherwise provide a premises map database, a premises security database, one or more object recognition model(s), and/or a playbook database. The premises map database may store one or more maps associated with one or more premises. The premises security database may store information about security sensors and automated devices located at one or more premises. The object recognition model(s) may be used to recognize particular objects appearing in images or video captured by the first user device 730 and/or the second user device 740. The playbook database may contain "playbook" templates indicating what actions should be taken in response to certain damage conditions, e.g., where damage to a premises is so severe that only a user device equipped with a particular type of sensor is suitable for surveying the premises. In some embodiments, the damage assessment computing platform 710 may be integrated with the first user device 730 and/or the second user device 740.

The first user device 730 and the second user device 740 may be the same as or similar to computing devices 141 of FIG. 1 and may include one or more personal computers (e.g., laptop, desktop, or tablet computers), servers (e.g., web servers, database servers), specialized sensor devices (e.g., specialized hardware devices for recording and processing sensor data, short-range communication systems, and the like), or mobile communication devices (e.g., mobile phones, portable computing devices, and the like), or the like. The first user device 730 and the second user device 740 may be configured to perform various functions, including surveying a premises, capturing data, e.g., depth sensor data from a laser scanning sensor such as a LIDAR sensor, photographic or video data on the premises, communicating the data to the damage assessment computing platform 710, moving towards a location of potential damage at a premises and capturing sensor data about the potential damage condition. The first user device 730 and the second user device 740 may be equipped with various sensors to capture sensor data and various equipment to interact with other devices involved in the damage detection and analysis, as further described below. In some instances, the first user device 730 and the second user device 740 may include one or more depth sensors or LIDAR sensors used for obtaining three-dimensional scans of an area or a series of areas. The first user device 730 and the second user device 740 may be configured take and collect depth sensor data in one or more iteration, e.g., by positioning the user device at different locations and/or angles in the premises. In order to obtain three-dimensional scans with resolution sufficient to capture varying amounts and/or types of damage, including small damage, multiple iteration of scans may be performed. For example, an initial scan may include a broad scan covering a wide area of the premises, followed by one or more close range scans targeting specific areas of the premises.

Figure 8:
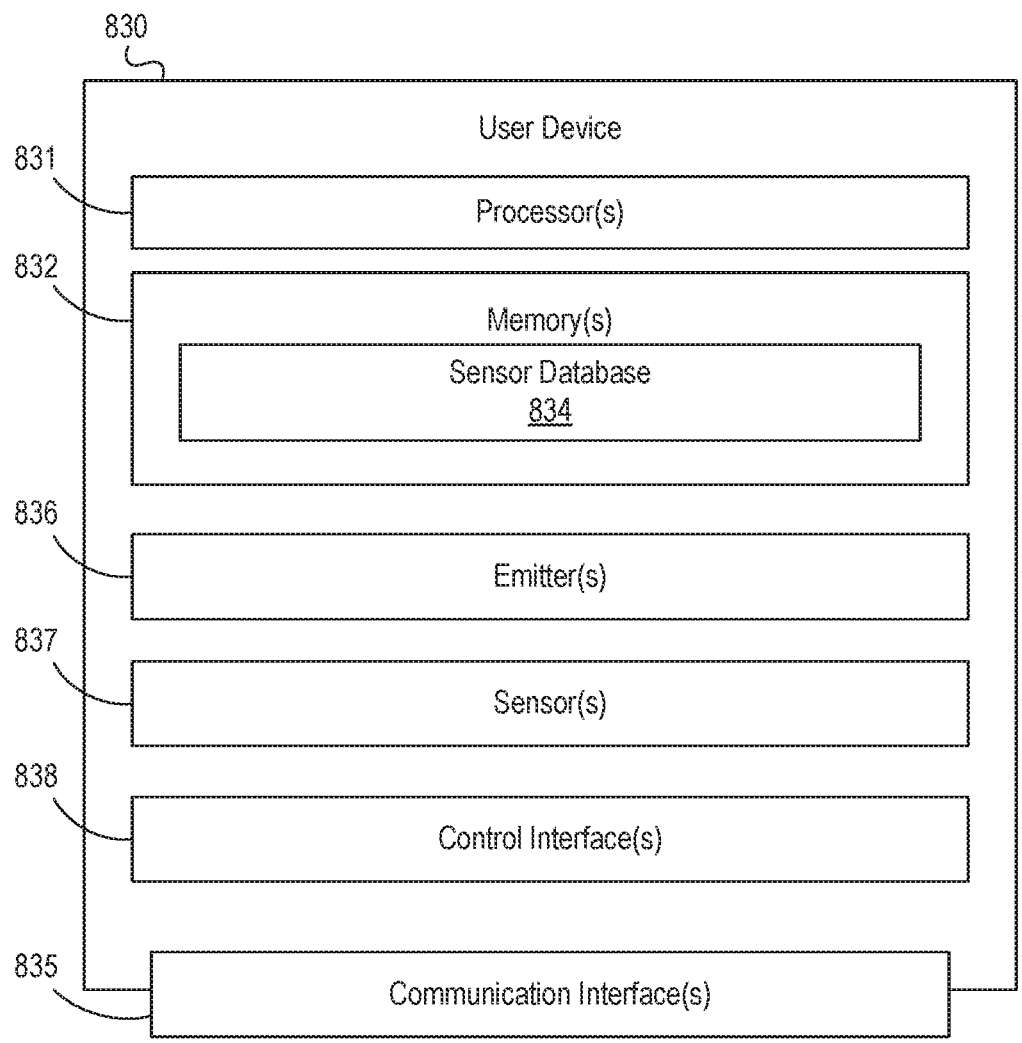
FIG. 8 illustrates an operating environment for a user device for detecting and analyzing damage conditions to external features of a premises in accordance with one or more aspects of the present disclosure.

Referring to FIG. 8, a user device 830, similar to the first user device 730 or the second user device 740 of FIG. 7, may include a processor 831, memory 832, a communication interface 835, one or more emitters 836, one or more sensors 837, and one or more control interfaces 838. Processor 831 may control operations of the one or more emitters 836, the one or more sensors 837, and/or the one or more control interfaces 838. Memory 832 may store instructions that, when executed by processor 831, cause the one or more emitters 836, the one or more sensors 837, and/or the one or more control interfaces 838 to perform one or more functions. Communication interface 835 may include one or more wireless network interfaces, and communication interface 835 may connect the user device 830 to a damage assessment computing platform, such as damage assessment computing platform 710. Memory 832 may store and/or otherwise provide a sensor database 834. The sensor database 834 may store information captured by the sensors 837.

Emitters 836 may include audio speakers for playing audio messages, and/or may include lasers, projectors, or other light emitters for pointing to and/or designating exits and routes, and the like. Sensors 837 may sense conditions such as depth measurement, surface topography, and the like. In some examples, sensors 837 may also include cameras (e.g., image and/or video cameras for the collection of visual photographs, two-dimensional, and/or 360-degree high-definition videos) and microphones. Such data collected via sensors 837 may include temperature data, indication of the presence of smoke, depth sensors, carbon monoxide, radiation, or other such data, as well as audio, images and videos. Sensors 837 may also include positioning sensors such as GPS sensors as well as radar, sonar, infrared, LIDAR, and the like. Control interfaces 838 may allow interaction with sensors 837 to control one or more sensor settings, targeted sensor areas, data capture settings, and the like.

In some example, the user device 830 may include a smartphone or similar mobile user device equipped with appropriate sensors, such as depth sensor, laser scanning sensors, LIDAR sensors, and the like. Accordingly, depth data, laser scan data, LIDAR sensor data, and the like may be collected from the sensors 837 for creating a three-dimensional surface model, having an artificial intelligence engine examine the data, presenting the three-dimensional surface model and related assessment to an insurer computing device, generating damage recommendations, and the like, and described in further detail below. Such assessments and recommendations may provide more accurate damage assessments, including better distinguishing new damage from existing damage. In some examples, the user device 830 may collect sensor data from sensor 837 and subsequently provide the data to a cloud computing network, e.g., for subsequent use by a damage assessment computing platform 710. In some examples, the damage assessment computing platform 710 may use an artificial intelligence engine to analyze the three-dimensional surface model and image/video package of the premises to calculate recommended claim estimates. The damage assessment computing platform 710 may receive measurements of the premises and/or additional property information to determine more accurate damage claim estimates.

Sensors 837 may include one or more LIDAR sensors for capturing depth or surface topography data. LIDAR sensors may operate by pinging lasers off of objects, which then return to the laser source, and measuring a distance (i.e., a depth) based on the timing of a return laser pulse. In some examples, the user device 830 may measure depth based on a single light pulse from a sensor 837, or based on waves of lights pulse sent out in a spray of infrared dots that may be used to create a field of points used in mapping out a three-dimensional space and any objects therein. In some instances, a damage assessment computing platform 710 may be configured to map out three-dimensional spaces and then may layer virtual objects thereon, e.g., to represent an object no longer present after a damage condition occurred, to assist in damage assessment calculation. Similarly, objects sensed by the LIDAR sensor may subsequently be removed from the three-dimensional space. In some examples, LIDAR sensors may be used in combination with image-capturing sensor in order to obtain image data or video data with improved focus accuracy based on depth information of a target area. In some instances, data from LIDAR sensor may be used to mesh out three-dimensional objects and premises, layer virtual objects thereon, and/or remove sensed objects therefrom.

Figure 9:
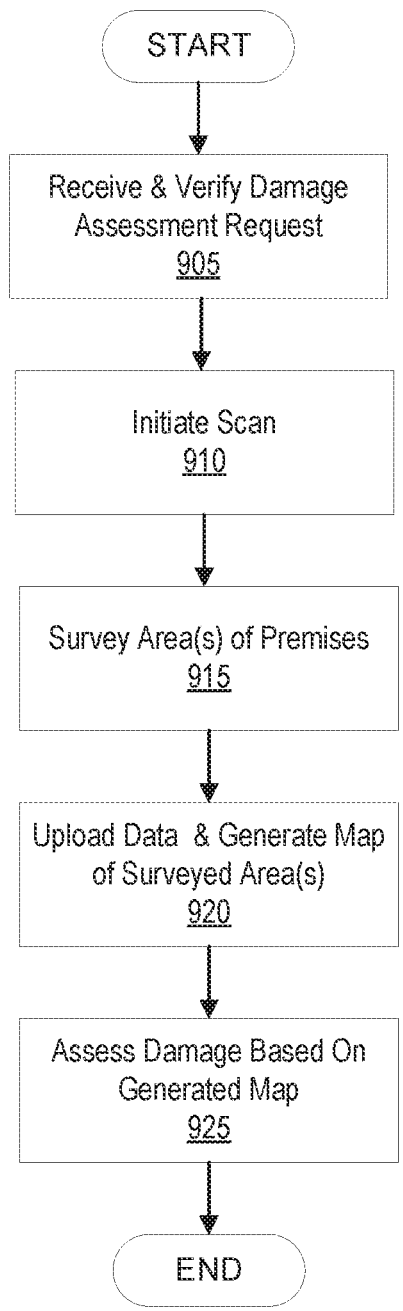
FIG. 9 illustrates a method for detecting and analyzing damage conditions to external features of a premises using a sensor in a user device in accordance with one or more aspects of the present disclosure.

FIG. 9 depicts an illustrative method for using sensors to detect and analyze damage conditions at a premises. At step 905, the damage assessment computing platform 710 may receive, and subsequently verify, a damage assessment request, e.g., from a client-side computing device. The damage assessment request may include information relating to the property, e.g., address, premises type, location descriptors of the potential damage, a damage type identification, premises owner or resident information, insurance policy information associated with the premises, and the like. Upon receiving the damage assessment request, the damage assessment computing platform 710 may verify one or more components of information provided with the damage assessment request. If any errors are noted, or if a key information component has been omitted, the damage assessment computing platform 710 may send a prompt to the client-side computing device from which the damage assessment request originated, where the prompt may include missing or potentially erroneous information component(s) and prompt a user to re-enter such information component(s).

Subsequently, at step 910, the damage assessment computing platform 710 may initiate a scan of the premises. Initiating a scan of the premises may include transmitting one or more instructions to a user device, the user device subsequently setting up a sensor scan suitable for surveying the potential damage, e.g., based on information provided with the damage assessment requests, and determining suitable data to be obtaining in surveying the premises associated with the damage assessment request.

At step 910, the user device may receive instructions regarding specific locations or areas of the premises to direct the scans. The user device may receive instructions for a series of scans around the potential damage location and/or advancing through a number of different areas of the premises. If sensors used by the user device have specific range limitations, the user device may present instructions to the operator to perform scans at targeted locations of the premises to obtain information sufficient to generate a three-dimensional scan of the premises. In some instances, while the user device is moved throughout the premises containing multiple scans, the user device may continually capture sensor data, e.g., depth data, image data, video data, and the like. In some instances, sensors in the user device may be activated or initiated to capture data based on a triggering event, such as a location sensor pinging in a target spatial location. Upon such a triggering event occurring, sensors in the user device may capture depth data to be sent to damage assessment computing platform 710 for further analysis and assessment.

Upon initiating one or more surface scans at the premises, at step 915, the user device may survey one or more areas of the premises to generate a three-dimensional surface scan for detection and analysis of a damage condition in accordance with the damage assessment request. In some examples, the user device may initially map a premises by exploring the premises and capturing sensor data throughout the premises. The user device may execute an exploration algorithm to initially survey the premises, using sensors to detect the surrounding environment and surface topography. In this way, the user device may collect an initial surface scan throughout one or more designated areas of a premises. The user device may use position data (e.g., based on GPS signals and/or local beacon signals) and/or generate models of the premises in order to ensure that all pertinent areas of the premises are explored. In some embodiments, the user device may continually communicate positioning sensor data (e.g., high and low resolution image data, LIDAR data, infrared data, sonar data, and/or the like) to the damage assessment computing platform 710, which in turn may generate the models (e.g., three-dimensional models) of the premises for exploration purposes and communicate the models back to the user device. In some instances, a three-dimensional model may be initially generated using a coarse mesh structure, and certain areas may be designated for follow-on scan, e.g., where potential damage was detected, where complex surface topography was detected, and the like.

The user device may upload some or all of the captured sensor data to the damage assessment computing platform 710 in order for the damage assessment computing platform 710 to generate a three-dimensional map of the premises. A user device, such as the first user device 730 or the second user device 740, may communicate wirelessly with the damage assessment computing platform 710 (e.g., via network 750) as illustrated at FIG. 2. However, other embodiments may use different network topologies to connect the user device to the damage assessment computing platform 710.

At step 915, as part of the surveying the area, the user device may capture sensor data in the area of the potential damage condition. In some instances, one or more sensors in the user device may be activated or initiated to capture data associated with the premises. The one or more sensors in the user device may capture data to be sent to damage assessment computing platform 710 for further analysis and assessment. The user device may capture sensor data throughout the potential damage location and/or areas nearby to the potential damage location that may help to determine the extent of the potential damage condition, if the potential damage condition is changing or ongoing, the like. The user device may continuously and/or periodically upload the captured sensor data to the damage assessment computing platform 710 for analysis of the sensor data.

Figure 10:
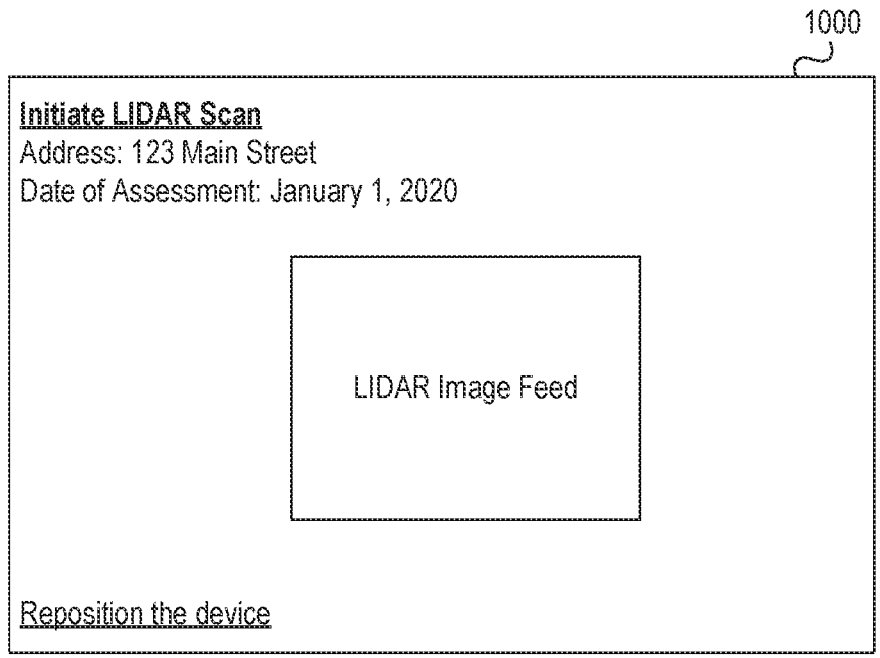
FIGS. 10 and 11 depict illustrative user interfaces involved in detecting and analyzing to damage conditions to external features of a premises using a sensor in a user device in accordance with one or more aspects of the present disclosure.

As part of surveying one or more areas of a premises at step 915, the damage assessment computing platform 710 and/or user device may display an image feed of a LIDAR sensor, and may provide controls for adjusting a position of the user device, adjusting a setting of the sensor, and/or responding to the damage condition. The example user interface 1000 of FIG. 10 includes a LIDAR image feed to provide a display of a current target area of the LIDAR sensor. For example, the user interface 1000 may include information identifying the premises being assessed (e.g., an address, a vehicle identification, and the like), information identifying date and/or timing of the assessment, as illustrated. Additionally, the damage assessment computing platform 710 may also allow a reviewer to reposition the device to perform one or more additional sensor scans. The reviewer may select more than one adjustment to conduct additional scans, e.g., repositioning a view angle of the user device and a resolution setting. The user interface 1000 may additionally or alternatively allow the viewer to view an image feed as the user device is repositioned and/or adjusted, or as a scan of a target area is performed.

As part of surveying one or more areas of a premises at step 915, the user device may access a customer shop, and scan an area of the premises with the user device to detect potential damage to the premises. As part of the scan, photographic and/or video files of the premises may be taken. In some instances, the scan taken at step 915 may occur as part of a virtual assist session associated with the damage assessment computing platform 710. The scanned data may include three-dimensional point cloud data, GPS location data, weather history, manually provided input, past claim data, and the like.

At step 920, after the captured premises data has been uploaded to the damage assessment computing platform 710, the damage assessment computing platform 710 may generate a map of the premises. The generated map may include a two-dimensional map and/or a three-dimensional map of the premises generated based on the captured sensor data. The sensor data may indicate (e.g., using LIDAR, radar, sonar, image/video data, positioning data, or the like) a topography of the premises as well as where obstacles appear in the premises, e.g., chimneys, vents, skylights, flashing, gutters on a roof of a premises, thickness of shingles, possible age and/or fidelity of the roof. The damage assessment computing platform 710 may use two-dimensional and/or three-dimensional reconstruction techniques to generate models of the premises, which may be converted to and/or used as the maps. Using such techniques, the damage assessment computing platform 710 may determine depth data from multiple two-dimensional images (e.g., using triangulation techniques), from three-dimensional images captured by multiple cameras onboard the user devices, and/or from captured sensor data such as LIDAR/sonar/radar data, and use such depth data to generate the models.

The damage assessment computing platform 710 may further generate maps that contain indications of other sensor readings. Thus the two-dimensional and/or three-dimensional maps may include sensor readings for various locations in the premises. For example, the sensor readings captured by the user device may indicate that a location within a surveyed area was measured to have an anomalous change in topography, e.g., due to roof damage. Such indications may be stored in the map for multiple sensor data.

In some cases, the user devices may capture and upload multiple sets of sensor data for the premises (e.g., step 915 may be repeated) at different resolutions, at various times (e.g., different times of day), in various conditions (e.g., various weather conditions), and/or using a number of repeated scans to check for anomalous sensor readings. The damage assessment computing platform 710 may use the multiple sets of data to average out temporary fluctuations in data in order to generate a more accurate map. In one example, the damage assessment computing platform 710 may use such data to remove from the map obstacles that do not appear in every set of data, which may correspond to temporary objects, or even people or animals. Additionally or alternatively, the damage assessment computing platform 710 may thus obtain ranges of normal sensor data and store such ranges within the map.

The generated map may be tagged with topographical data for easier review of the map. The damage assessment computing platform 710 may determine edges or end points of an area, and may assign perimeters to one or more designated areas. The automatically assigned perimeters may be based on qualities associated with the area that may be determined by the damage assessment computing platform 710 automatically (e.g., edges of the premises, points of changing slope, corners, etc.). Additionally or alternatively, more descriptive names (e.g., north-facing roof portion, etc.) may be assigned (e.g., by a human reviewer).

At step 925, the damage assessment computing platform 710 may assess damage to the premises based on the map generated by the sensor data. In some examples, the damage assessment computing platform 710 may analyze the sensor data and/or other premises data in order to assess a scope of damage to the premises. Assessing the damage at step 925 may include identifying one or more steps to mitigate and/or repair damage to designated areas of the premises. Assessing the damage at step 925 may include transmitting a damage report to a display interface that includes an assessed damage condition, as will be described in greater detail below. As part of assessing the damage to the premises at step 925, the damage assessment computing platform 710 may receive and analyze various data components received from the user device in addition to the three-dimensional map, such as point cloud data, historical weather data, data related to previous claims, and the like.

The damage assessment computing platform 710 may additionally analyze video and/or image data using one or more recognition models trained to detect situations associated with a damage condition, e.g., dents, ruptures, leaks, tears, or the like in a surface. For example, one of the recognition models may be trained to recognize the presence of a dent in a surface image. Therefore, the damage assessment computing platform 710 may input video and/or image data received from the premises into the recognition model trained using techniques, such as machine learning to recognize a damage condition, and if an output of the recognition model indicates a presence of damage, the damage assessment computing platform 710 may detect a damage condition. The recognition model and/or other recognition models may be trained to recognize other damage conditions from images and/or video, such as water damage or fire damage. Other models may be trained to recognize other damage conditions from a three-dimensional surface scan, such as water flooding damage, pipe bursts, or other such indications of potential property damage conditions. The damage assessment computing platform 710 may also analyze other sensor data using one or more recognition models. For example, the damage assessment computing platform 710 may capture temperature data, pressure data, and other such sensor data and analyze it using recognition models trained to detect damage conditions.

The damage assessment computing platform 710 may have previously trained one or more recognition models using a training data set consisting of various images and/or videos, audio data, and/or other sensor data, some of which are associated with a particular damage condition and some of which are not. The training data set may further correlate with target variable(s) indicating whether each data item (e.g., sensor data) is associated with a particular damage condition or not. The damage assessment computing platform 710 may use one or more statistical and/or machine learning techniques to develop the object recognition models using the training data set. In this way, the object recognition models may be trained to recognize damage conditions based on depth sensor data. In some cases, the model may be trained to detect anomalies related to abnormal data and/or sensor readings.

In some cases, the damage assessment computing platform 710 may compare received surface data (e.g., depth sensor data received from a LIDAR sensor) to previously-recorded images and/or maps generated. For example, upon enrolling in a premises protection program or insurance plan, a user device may conduct an initial scan of the premises to take an initial survey of the premises. The initial survey may include various information components relating to the premises, such as an age of one or more components of the premises, repair history, previous damage indications, and the like. Significant differences between newly received data and the initially-obtained data or surface map may indicate that damage to the premises has occurred. The damage assessment computing platform 710 may directly compare surface scans (e.g., after performing warping to account for location and/or perspective shifts) and/or generate a map from the received imagery to compare to the initially-generated map. Thus, the map generated at step 920 may be a second map (or third map or so on) generated according to the techniques described herein and compared to an initially-generated map. Significant differences may indicate a condition comprising damage to the premises.

In some cases, the damage assessment computing platform 710 may compare sensor data to one or more sensor levels and/or ranges stored in the initially-generated map. If certain sensor data exceeds certain levels and/or varies by a certain amount from the sensor data stored in the initially-generated map, a damage condition may be detected. For example, if the map indicates that a location within a premises has a rapid topographical variation that was not previously detected, then a detection of such a variation may tend to indicate a damage condition. In some cases, such a detection of an anomalous sensor reading may be insufficient to trigger damage condition, but multiple such anomalous readings may cause the damage assessment computing platform 710 to detect a damage condition.

The damage assessment computing platform 710 may additionally or alternatively analyze event data received from the premises system 720. Such event data may indicate, for example, whether a water leak detector was triggered. Some events may automatically lead to detection of a damage condition with no further analysis (e.g., activation of an "alarm" button). Some events may cause the damage assessment computing platform 710 to receive additional data for analysis. For example, a water leak detector being triggered may cause the damage assessment computing platform 710 to request (and/or the premises system 720 to automatically send) high-resolution sensor data and the like to the damage assessment computing platform 710 if the damage assessment computing platform 710 was not already receiving such data from the premises system 720. The damage assessment computing platform 710 may then analyze the additional data to detect whether a potential damage condition is present or not (e.g., whether there was a false alarm due to a faulty sensor or the like). For example, the damage assessment computing platform 710 may analyze video data to detect whether other signs of a potential damage condition exist as described above.

As part of assessing damage to the premises at step 925, the damage assessment computing platform 710 may determine one or more areas associated with the damage condition. The damage assessment computing platform 710 may extract location information from the sensor data that was used to detect the damage condition. Additionally or alternatively, the damage assessment computing platform 710 may refer to the generated map, which may indicate where devices (e.g., devices of the premises system 720) are located. Additionally or alternatively, the damage assessment computing platform 710 may compare received sensor data associated with the damage condition to the generated map (e.g., if the map includes a generated three-dimensional model) in order to determine property damage at the premises. The damage assessment computing platform 710 may determine one or more areas associated with the damage condition based on various location(s) extracted from the sensor data and/or determined based on the sensor data.

In some instances, the damage assessment computing platform 710 may confirm that the damage condition exists. In some cases, a trained human operator (e.g., a dispatcher) may review the captured sensor data (including audio/video/image data and/or other sensor data) associated with the damage condition, other sensor data, and/or location data and confirm whether a damage condition exists. The damage assessment computing platform 710 may therefore transmit the sensor data associated with the damage condition (e.g., the sensor data on which the detection of the damage condition was based) and the location data (e.g., based on the generated map of the premises) to another computing system (e.g., an insurer computing system) for review. The damage assessment computing platform 710 may also transmit other sensor data, such as data from sensors located in the same area as the sensors that picked up the damage condition, sensors within a threshold distance of the location of the damage condition, and the like for review and confirmation of the damage condition. The damage assessment computing platform 710 may automatically confirm which damage conditions are present based on sensor data in conjunction with confidence intervals and one or more thresholds specific to a type of damage condition.

Figure 11:
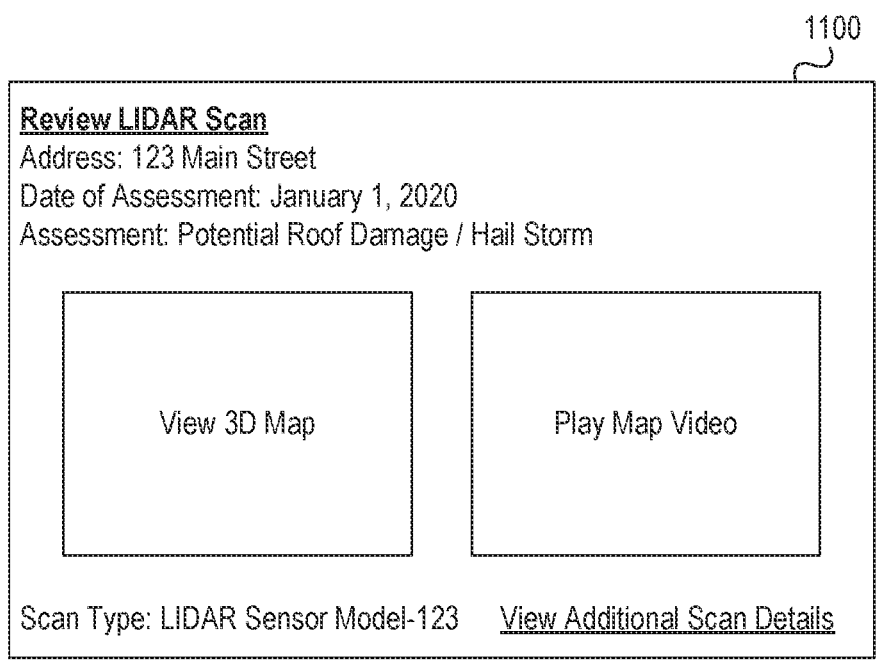

The damage assessment computing platform 710 may generate, send, and/or otherwise provide one or more user interfaces populated with sensor and location data for review by the operator, e.g., an adjustor who may be located remotely from the premises. FIG. 11 illustrates an example user interface 1100 for providing sensor data for review. The user interface 1100 may include information identifying the premises that was assessed (e.g., an address), information identifying date and/or timing of the assessment, and/or information identifying a type of potential damage related to the assessment, as illustrated. A two-dimensional or three-dimension video and/or a map video may be generated by damage assessment computing platform 710 based on the sensor data from one or more areas of the premises associated with the potential damage condition. In addition to or as an alternative to the display of a picture or video of the generated map, the user interface may display an interactive map with one or more selectable indicators within the map that provide additional information relating to surveyed information within the map (not illustrated). The user interface 1100 may display detected sensor data (e.g., image and/or video data as illustrated), and/or previous sensor readings and/or ranges for comparison. Such a display may allow a reviewer to determine if the sensor data is abnormal for the premises. The user interface 1100 may display video and/or image data captured nearby the location of the damage condition (e.g., an image showing with three-dimensional scan with an area of identified damage). The user interface 1100 may further display controls for interacting with video, image, audio, and other sensor data (e.g., zoom, pan, play, and pause controls for interacting with image or video data). The user interface 1100 may also display information relating to the one or more user devices and/or related sensors (e.g., identification number, model number, model specifications, and the like) that conducted the survey of the property in assessing a potential damage condition, as illustrated.

As part of step 925, the damage assessment computing platform 710 may determine a response plan for responding to the one or more damage condition. The response plan may be tailored to the selected one or more damage conditions. For example, based on or more settings associated with the premises, the damage assessment computing platform 710 may submit a claim for the one or more damage conditions. In some instances, the damage assessment computing platform 710 may initiate a job ticket to initiate repair work to the premises. For each detected damage condition, the damage assessment computing platform 710 may activate certain responses, some of which may be dependent on each other. Many damage conditions may also call for mitigation techniques (e.g., deactivating one or more devices prone to failure due to the identified damage), which may be specific to the damage condition. The damage assessment computing platform 710 may store "playbooks," which may be templates indicating which actions should be taken in response to a given damage condition.

The damage assessment computing platform 710 may coordinate with a reviewer to confirm and/or modify the response plan. For example, the damage assessment computing platform 710 may send the response plan to the reviewer, and receive changes and/or a modified response plan in return. In some cases, the damage assessment computing platform 710 may begin executing the response plan before receiving review and feedback on the response plan, as will be described below. The damage assessment computing platform 710 may then begin executing the modified/approved response plan after receiving confirmation from the reviewer.

A user (e.g., a reviewer) may access a user interface and edit the response plan as appropriate. For example, the user may modify an order in which the action items will be executed, assign or adjust priorities associated with the items, adjust details of the items (e.g., changing a location associated with an action item, adding a location to the action item, etc.). The reviewer may also add or delete items. The reviewer may then confirm the response plan via the user interface. The damage assessment computing platform 710 may receive the confirmed response plan and begin executing the confirmed response plan.

In some instances, the damage assessment computing platform 710 may establish a communication with a damage repair system in order to inform premises repair personnel of the damage condition and request repair work. A human operator may communicate with the repair personnel and/or the communication may be automated. In some cases, the damage assessment computing platform 710 may provide sensor data and/or the generated three-dimensional surface data to the damage repair system so that the repair personnel may be better informed of the nature and extent of the damage condition. The damage assessment computing platform 710 may also inform the repair personnel of the response plan and/or coordinate with the repair personnel to further modify the response plan.

In some instances, the damage assessment computing platform 710 may receive an indication that repair personnel are on site. A dispatcher may be monitoring the repair personnel's position using data received from the damage repair system. The data may further indicate a status of repair work to the premises and/or any updates to the response plan. The damage assessment computing platform 710 may communicate with a user device associated with the repair personnel on site in the process of obtaining a scan of the premises and generating a three-dimensional map of the premises. For example, the damage assessment computing platform 710 may transmit communications relating to follow-on scans of the premises if a conducted scan was insufficiently captured premises data. As another example, damage assessment computing platform 710 may receive instructions relating to one or more settings or scan types to obtain a three-dimensional scan of the premises.

Certain embodiments described herein discuss damage detection and assessment using drones, such as UAVs or UGVs, and certain embodiments described herein discuss damage detection and assessment using drones sensors on user devices, such as LIDAR or other infrared sensors.

The systems and methods described herein beneficially allow for thorough and accurate detection of an external feature of a premises, such as a roof, based on drone data that may be captured at the premises. Upon receipt of a damage assessment request, one or more autonomous drones may be dispatched the premises to collect three-dimension sensor data, which may provide a more thorough and accurate assessment of damage to the premises. This detailed three-dimensional damage information may, in turn, allow for a more appropriate action to mitigate and/or repair the damage, e.g., so that only a damaged portion of the premises is repaired while remaining portion remain unchanged. Finally, having detailed three-dimensional damage information about the premises may allow for a more accurate claim amount for an insurance policy holder.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computer systems discussed above may be combined into a single computer system, and the various functions of each computer system may be performed by the single computer system. In such arrangements, any and/or all of the above-discussed communications between computer systems may correspond to data being accessed, moved, modified, updated, and/or otherwise used by the single computer system. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computer-implemented method for damage assessment using three-dimensional surface scans, the method comprising:
   at a computing platform comprising at least one processor, at least one memory, and at least one communication interface:
      receiving, by the at least one processor, an electronic damage assessment request related to a property, the electronic damage assessment request comprising first location information;
      determining, by the at least one processor, based on second information provided by a mobile device comprising a LIDAR sensor associated with the computing platform, that the mobile device is in a target spatial location corresponding to the first location information;
      based on determining that the mobile device is in the target spatial location, initiating, by the at least one processor, a scan by the LIDAR sensor;
      receiving, by the at least one processor from the LIDAR sensor, depth sensor data associated with a surveyed area of the property;
      generating, by the at least one processor and based on the received depth sensor data, a three-dimensional surface scan of the surveyed area of the property;
      assessing, by the at least one processor, damage to the property based on the generated three-dimensional surface scan;
      transmitting, by the at least one processor, via the at least one communication interface, a damage report including the assessed damage to an interactive display interface of a computing system; and
      after receiving user input via the interactive display interface, initiating, by the at least one processor, another scan by the LIDAR sensor.

2. The method of claim 1, further comprising:
   determining, by the at least one processor, a zoom-in area on the surveyed area of the property;
   receiving, by the at least one processor, image data depicting the zoom-in area; and generating, by the at least one processor and based on the depth sensor data and the image data, the three-dimensional surface scan of the surveyed area of the property.

3. The method of claim 2, further comprising:
   executing a machine learning-based image recognition operation on the three-dimensional surface scan; and
   determining, by the at least one processor, at least one damage element based on the executed image recognition operation, the at least one damage element comprising any of a damage type, damage location, and estimated cost to repair.

4. The method of claim 3, further comprising:
   based on the determined at least one damage element, generating and electronically submitting, by the at least one processor, to a remote computing system via the at least one communication interface, at least one of a repair job ticket and an insurance claim.

5. The method of claim 1, further comprising performing at least one of:
   (1) layering, by the at least one processor, a virtual object on the three-dimensional surface scan; and
   (2) based on the depth sensor data, determining, by the at least one processor, a sensed object on the three-dimensional surface scan; and
   removing, by the at least one processor, the sensed object from the three-dimensional surface scan.

6. The method of claim 1, further comprising:
   generating, by the at least one processor and based on the depth sensor data, a user-interactive video feed; and
   during the scan, causing a control on the interactive display interface to play back the user-interactive video feed.

7. A computing system for damage assessment using three-dimensional surface scans, the computing system comprising at least one processor, at least one memory, and at least one communication interface, the at least one processor performing operations to:
   receive an electronic damage assessment request related to a property, the electronic damage assessment request comprising first location information;
   determine, based on second information provided by a mobile device comprising a LIDAR sensor associated with the computing system, that the mobile device is in a target spatial location corresponding to the first location information;
   based on determining that the mobile device is in the target spatial location, initiate a scan by the LIDAR sensor;
   receive, from the LIDAR sensor, depth sensor data associated with a surveyed area of the property;

generate, based on the received depth sensor data, a three-dimensional surface scan of the surveyed area of the property;

assess damage to the property based on the generated three-dimensional surface scan;

transmit, via the at least one communication interface, a damage report including the assessed damage to an interactive display interface of a computing system; and after receiving user input via the interactive display interface, initiate, by the at least one processor, another scan by the LIDAR sensor.

8. The computing system of claim 7, further comprising operations to:

determine a zoom-in area on the surveyed area of the property; receive image data depicting the zoom-in area; and generate, based on the depth sensor data and the image data, the three-dimensional surface scan of the surveyed area of the property.

9. The computing system of claim 8, further comprising operations to:

execute a machine learning-based image recognition operation on the three-dimensional surface scan; and determine at least one damage element based on the executed image recognition operation, the at least one damage element comprising any of a damage type, damage location, and estimated cost to repair.

10. The computing system of claim 9, further comprising operations to:

based on the at least one determined damage element, generate and electronically submit, to a remote computing system via the at least one communication interface, at least one of a repair job ticket and an insurance claim.

11. The computing system of claim 7, further comprising at least one operation to:

(1) layer a virtual object on the three-dimensional surface scan; and (2) based on the depth sensor data, determine a sensed object on the three-dimensional surface scan; and remove the sensed object from the three-dimensional surface scan.

12. The computing system of claim 7, further comprising operations to:

generate, based on the depth sensor data, a user-interactive video feed; and during the scan, cause a control on the interactive display interface to play back the user-interactive video feed.

13. One or more non-transitory computer-readable media comprising computer-executable instructions stored thereon, the instructions, when executed at a computing platform comprising at least one processor, at least one memory, and at least one communication interface, causing the computing platform to perform operations comprising:

receiving, by the at least one processor, an electronic damage assessment request related to a property, the electronic damage assessment request comprising first location information;

determining, by the at least one processor, based on second information provided by a mobile device comprising a LIDAR sensor associated with the computing platform, that the mobile device is in a target spatial location corresponding to the first location information;

based on determining that the mobile device is in the target spatial location, initiating, by the at least one processor, a scan by the LIDAR sensor;

receiving, by the at least one processor from the LIDAR sensor, depth sensor data associated with a surveyed area of the property;

generating, by the at least one processor and based on the received depth sensor data, a three-dimensional surface scan of the surveyed area of the property;

assessing, by the at least one processor, damage to the property based on the generated three-dimensional surface scan;

transmitting, by the at least one processor, via the at least one communication interface, a damage report including the assessed damage to an interactive display interface of a computing system; and after receiving user input via the interactive display interface, initiating, by the at least one processor, another scan by the LIDAR sensor.

14. The media of claim 13, the operations further comprising:

determining, by the at least one processor, a zoom-in area on the surveyed area of the property;

receiving, by the at least one processor, image data depicting the zoom-in area; and generating, by the at least one processor and based on the depth sensor data and the image data, the three-dimensional surface scan of the surveyed area of the property.

15. The media of claim 14, the operations further comprising:

executing a machine learning-based image recognition operation on the three-dimensional surface scan; and determining, by the at least one processor, at least one damage element based on the executed image recognition operation, the at least one damage element comprising any of a damage type, damage location, and estimated cost to repair.

16. The media of claim 15, the operations further comprising:

based on the at least one determined damage element, generating and electronically submitting, by the at least one processor, to a remote computing system via the at least one communication interface, at least one of a repair job ticket and an insurance claim.

17. The media of claim 13, the operations further comprising performing at least one of:

(1) layering, by the at least one processor, a virtual object on the three-dimensional surface scan; and (2) based on the depth sensor data, determining, by the at least one processor, a sensed object on the three-dimensional surface scan; and removing, by the at least one processor, the sensed object from the three-dimensional surface scan.

18. The media of claim 13, the operations further comprising:

generating, by the at least one processor and based on the depth sensor data, a user-interactive video feed; and during the scan, causing a control on the interactive display interface to play back the user-interactive video feed.

* * * * *